US012793136B1

(12) United States Patent
Mousseau et al.

(10) Patent No.: US 12,793,136 B1
(45) Date of Patent: Nov. 10, 2026

(54) SYNCHRONIZING NETWORK DATA RECORDS ACCORDING TO CHANGES IN NETWORK APPLICATION STATES

(71) Applicant: DK Crown Holdings Inc., Boston, MA (US)

(72) Inventors: Charles Raymond Mousseau, Winnipeg (CA); Stephen Anthony Rose, Boston, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/389,636

(22) Filed: Nov. 14, 2025

(51) Int. Cl.
*G06Q 40/04* (2012.01)

(52) U.S. Cl.
CPC .................................. *G06Q 40/042* (2025.08)

(58) Field of Classification Search
CPC .............. G06Q 40/042; H04L 41/0816; H04L 41/082
USPC .......................................................... 709/223
See application file for complete search history.

(56) References Cited

U.S. PATENT DOCUMENTS 7,676,583 B2 * 3/2010 Eaton ..................... G06Q 30/08 709/227
7,702,759 B2 * 4/2010 Cheshire ................. H04L 67/34 717/121
10,467,693 B2 * 11/2019 Studnitzer .............. G06Q 40/04
12,363,194 B1 * 7/2025 Morris .................... H04L 41/22
12,470,634 B1 * 11/2025 Jaffa ..................... H04L 67/303
2008/0077938 A1 * 3/2008 Wajs ....................... G06F 21/10 719/313
2020/0044927 A1 * 2/2020 Apostolopoulos ........................... H04L 41/0893
2022/0012805 A1 * 1/2022 Hampton ............ H04L 41/5022

FOREIGN PATENT DOCUMENTS

CN 101202673 B * 4/2012 ......... H04L 63/0428

* cited by examiner

*Primary Examiner* — Ruolei Zong
(74) *Attorney, Agent, or Firm* — Foley & Lardner LLP

(57) ABSTRACT

Systems and methods for modeling dynamic data conditions are disclosed. A system can establish a network communication session with a client device in response to a first request. The system can transmit, to the client device, instructions for network application formatting during the network communication session. The system can receive, from the client device, a second request to advance a state of a network application of the network communication session, the second request including a state value for the network application. The system can iteratively determine, via the network application, a modification value of a sequence of modification values to be iteratively applied to the state value to generate an updated state value until a termination condition has been satisfied. The system can update a network profile associated with the client device based on the updated state value and the termination condition.

20 Claims, 9 Drawing Sheets

SYNCHRONIZING NETWORK DATA RECORDS ACCORDING TO CHANGES IN NETWORK APPLICATION STATES

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

One aspect of the present disclosure relates to a system. The system can establish a network communication session with a client device in response to a first request. The system can transmit, to the client device, instructions for network application formatting during the network communication session. The system can receive, from the client device, a second request to advance a state of a network application of the network communication session, the second request including a state value for the network application. The system can iteratively determine, via the network application, a modification value of a sequence of modification values to be iteratively applied to the state value to generate an updated state value until a termination condition has been satisfied. The system can update a network profile associated with the client device based on the updated state value and the termination condition.

In some implementations, the system can iteratively apply each modification value of the sequence of modification values to the state value to generate the updated state value. In some implementations, the system can determine that the sequence of modification values satisfies a reduction condition. In response to determining that the sequence of modification values satisfies the reduction condition, the system can update the state value according to the reduction condition value, and assign a multiplier value to the state value. In some implementations, the system can iteratively determine a second sequence of modification values for the state value and generate the updated state value by applying the multiplier value and the second sequence of modification values to the state value. In some implementations, the system can transmit each modification value of the sequence of modification values to the client device.

In some implementations, the system can determine that the sequence of modification values satisfies the termination condition based on the updated state value satisfying a threshold. Additionally, or alternatively, the system can determine that the number of modification values in the sequence of modification values satisfies the termination condition based on including a predetermined number of modification values. This predetermined number of modification values may represent a termination threshold for the termination condition. In some implementations, the system can cause the client device to present a plot representing application of the sequence of modification values to the state value. In some implementations, the system can cause the client device to present a set of historical data corresponding to respective state values of a plurality of second client devices of a second network communication session. In some implementations, the system can determine each modification value of the sequence of modification values by executing a selection function with respect to at least one value table.

Another aspect of the present disclosure relates to a method. The method includes establishing, by at least one processor, a network communication session with a client device in response to a first request. The method includes transmitting, by the at least one processor, to the client device, instructions for network application formatting during the network communication session. The method includes receiving, by the at least one processor, from the client device, a second request to advance a state of a network application of the network communication session, the second request including a state value for the network application. The method includes iteratively determining, by the at least one processor, via the network application, a modification value of a sequence of modification values to be iteratively applied to the state value to generate an updated state value until a termination condition has been satisfied. The method includes updating, by the at least one processor, a network profile associated with the client device based on the updated state value and the termination condition.

In some implementations, the method can include iteratively applying each modification value of the sequence of modification values to the state value to generate the updated state value. In some implementations, the method can include iteratively determining a second sequence of modification values for the state value and generating the updated state value by applying the multiplier value and the second sequence of modification values to the state value. In some implementations, the method can include transmitting each modification value of the sequence of modification values to the client device. In some implementations, the method can include determining that the sequence of modification values satisfies the termination condition based on the updated state value satisfying a termination threshold.

In some implementations, the method can include determining that the termination condition has been satisfied upon determining a predetermined number of modification values. In some implementations, the method can include causing the client device to present a plot representing application of the sequence of modification values to the state value. In some implementations, the method can include causing the client device to present a set of historical data corresponding to respective state values of a plurality of second client devices of a second network communication session. In some implementations, the method can include determining each modification value of the sequence of modification values by executing a selection function with respect to at least one value table.

One aspect of the present disclosure relates to a system. The system can establish a network communication session with a client device in response to a first request. The system can transmit, to the client device, instructions for network application formatting during the network communication session. The system can receive, from the client device, a second request to advance a state of a network application of the network communication session, the second request including a state value for the network application. The system can iteratively update the state of the network application, wherein at least one iteration involves performing operations comprising: selecting, based on a respective state modification value of a previous iteration satisfying a first criterion, a first set of state modification values from a plurality of sets of state modification values; determining the respective state modification value for the at least one iteration based on the first set of state modification values; and updating the state of the network application according to the respective state modification value for the at least one iteration. The system can update a network profile associated with the client device upon determining that the state of the network application satisfies a termination condition.

In some implementations, the system can select one of the plurality of sets of state modification values based on the respective state modification value of the previous iteration being less than a predetermined value. In some implementations, the system can iteratively update the state of the network application. A second iteration can include performing operations comprising selecting, based on the respective state modification value of the first iteration satisfying a second criterion, a second set of state modification values from the plurality of sets of state modification values; determining the respective state modification value for the second iteration based on the second set of state modification values; and updating the state of the network application according to the respective state modification value for the second iteration. In some implementations, the system can iteratively select a sequence of modification values to update the state of the network application from one or more of the plurality of sets of modification values. In some implementations, the system may be further configured to update the state of the network application by multiplying a value by the respective state modification value for the at least one iteration. In some implementations, the first set of state modification values may represent a first distribution of values and a second set of state modification values of the plurality of state modification values represents a second distribution of values.

In some implementations, the first distribution comprises a first number of values having a first type and the second distribution comprises the first number of values having a second type. In some implementations, the first distribution comprises a second number of values having the second type, and wherein a first average of the values of the first distribution having the first type is less than a second average of the values of the first distribution having the second type. In some implementations, the first criterion is satisfied upon the respective state modification value of the previous iteration being associated with a first type. In some implementations, the system can determine that a sequence of modification values comprising the respective state modification value of the previous iteration and the respective state modification value for the at least one iteration satisfies a reduction condition. In some implementations, the system can, responsive to determining that the sequence of modification values satisfies the reduction condition: update the state value according to a reduction condition value, and assign a multiplier value to the state value.

Another aspect of the present disclosure relates to a method. The method includes establishing, by at least one processor, a network communication session with a client device in response to a first request. The method includes transmitting, by the at least one processor, to the client device, instructions for network application formatting during the network communication session. The method includes receiving, by the at least one processor, from the client device, a second request to advance a state of a network application of the network communication session, the second request including a state value for the network application. The method includes iteratively updating, by the at least one processor, the state of the network application, wherein at least one iteration involves performing operations comprising: selecting, based on a respective state modification value of a previous iteration satisfying a first criterion, a first set of state modification values from a plurality of sets of state modification values; determining the respective state modification value for the at least one iteration based on the first set of state modification values; and updating the state of the network application according to the respective state modification value for the at least one iteration. The method includes updating, by the at least one processor, a network profile associated with the client device upon determining that the state of the network application satisfies a termination condition.

In some implementations, the system can select one of the plurality of sets of state modification values based on the respective state modification value of the previous iteration being less than a predetermined value. In some implementations, the system can iteratively update the state of the network application. A second iteration can include performing operations comprising selecting, based on the respective state modification value of the first iteration satisfying a second criterion, a second set of state modification values from the plurality of sets of state modification values; determining the respective state modification value for the second iteration based on the second set of state modification values; and updating the state of the network application according to the respective state modification value for the second iteration. In some implementations, the method can include iteratively selecting a sequence of modification values to update the state of the network application from one or more of the plurality of sets of modification values. In some implementations, the method may include updating the state of the network application by multiplying a value by the respective state modification value for the at least one iteration. In some implementations, the first set of state modification values may represent a first distribution of values and a second set of state modification values of the plurality of state modification values represents a second distribution of values.

In some implementations, the first distribution comprises a first number of values having a first type and the second distribution comprises the first number of values having a second type. In some implementations, the first distribution comprises a second number of values having the second type, and wherein a first average of the values of the first distribution having the first type is less than a second average of the values of the first distribution having the second type. In some implementations, the first criterion is satisfied upon the respective state modification value of the previous iteration being associated with a first type. In some implementations, the method may include determining that a sequence of modification values comprising the respective state modification value of the previous iteration and the respective state modification value for the at least one iteration satisfies a reduction condition. In some implementations, the method may include, responsive to determining that the sequence of modification values satisfies the reduction condition: updating the state value according to a reduction condition value, and assigning a multiplier value to the state value.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for managing network sessions of network applications. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful. Section A describes a network environment and computing environment to implement embodiments described herein. Section B describes systems and methods for managing network sessions of network applications.

The systems and methods of this technical solution provide techniques for modeling data patterns. Modeling certain data patterns with traditional random generation models, such as linear random walks, can be difficult due to real-world events introducing significant, non-random trends in the data. The system and methods of this technical solution address these and other issues by providing skewed sets of modification values and dynamic adjustment of volatility.

A. Computing and Network Environment for Managing Network Sessions of Network Applications Referring to FIG. 1A, an embodiment of a network environment is depicted for managing network sessions of network applications. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Figure 1A:
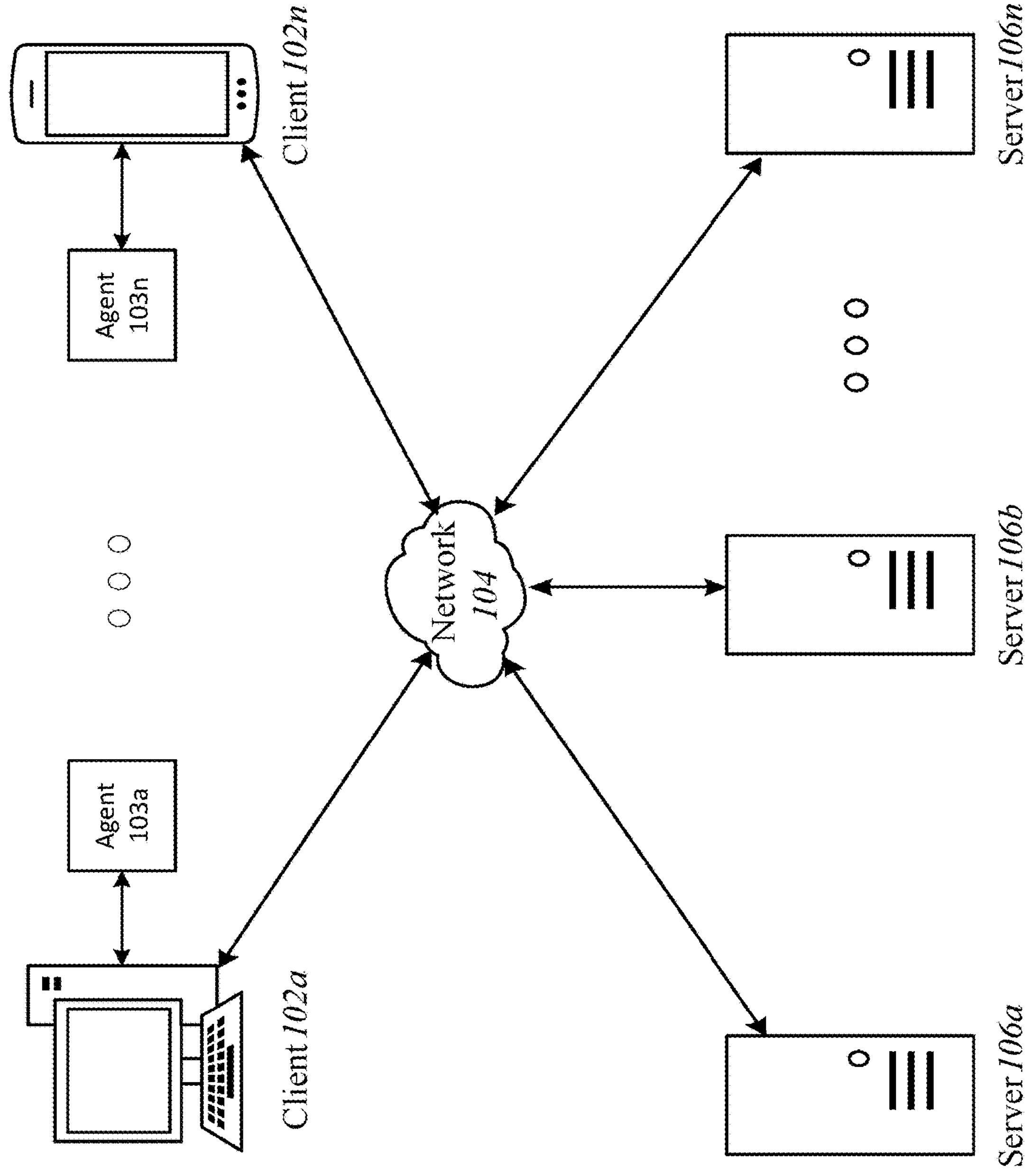
FIG. 1A is a block diagram depicting an embodiment of a network environment comprising a client device in communication with a server device.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
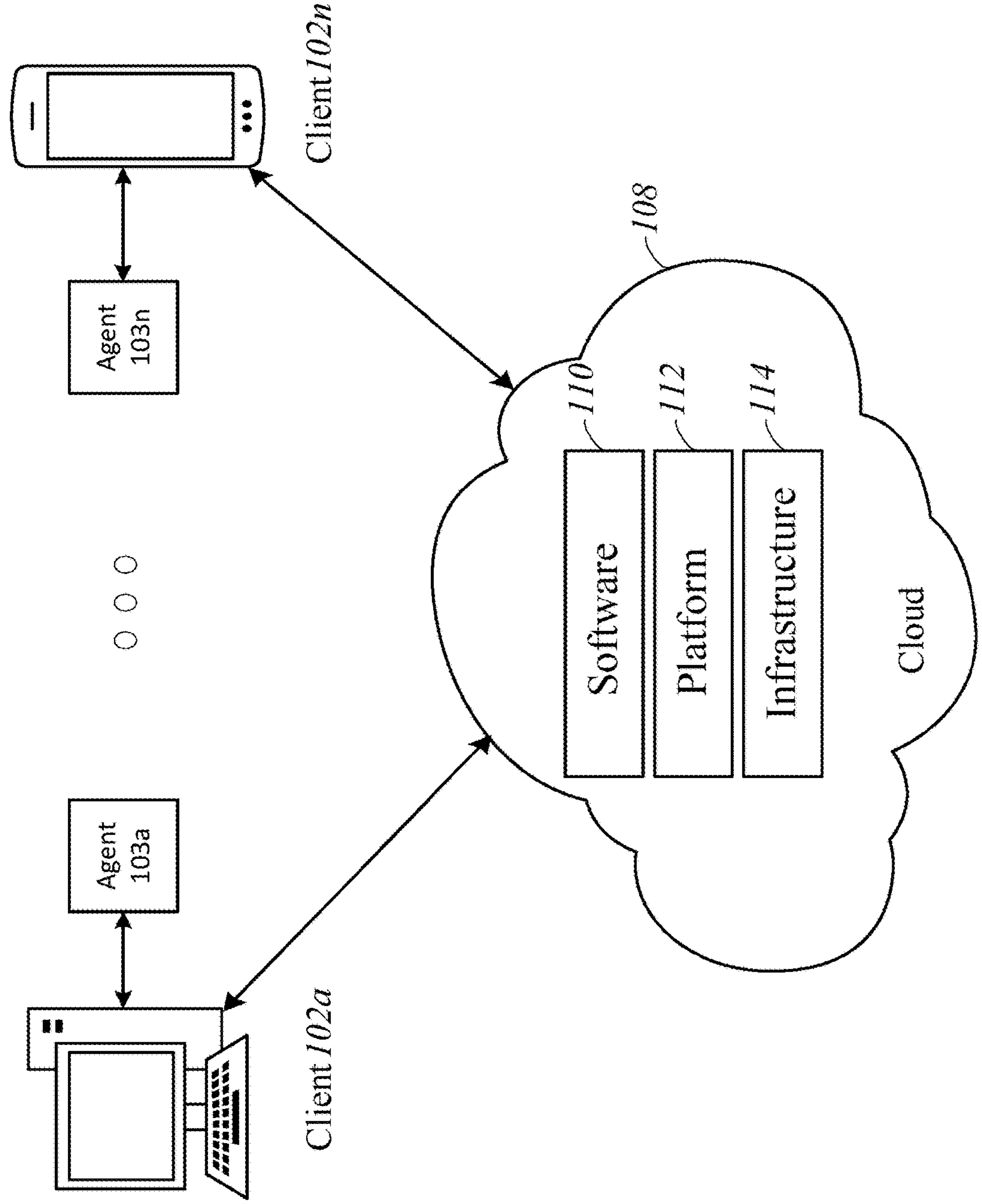
FIG. 1B is a block diagram depicting a cloud computing environment comprising a client device in communication with cloud service providers.

Referring to FIG. 1B, a cloud computing environment is depicted for managing network sessions of network applications. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
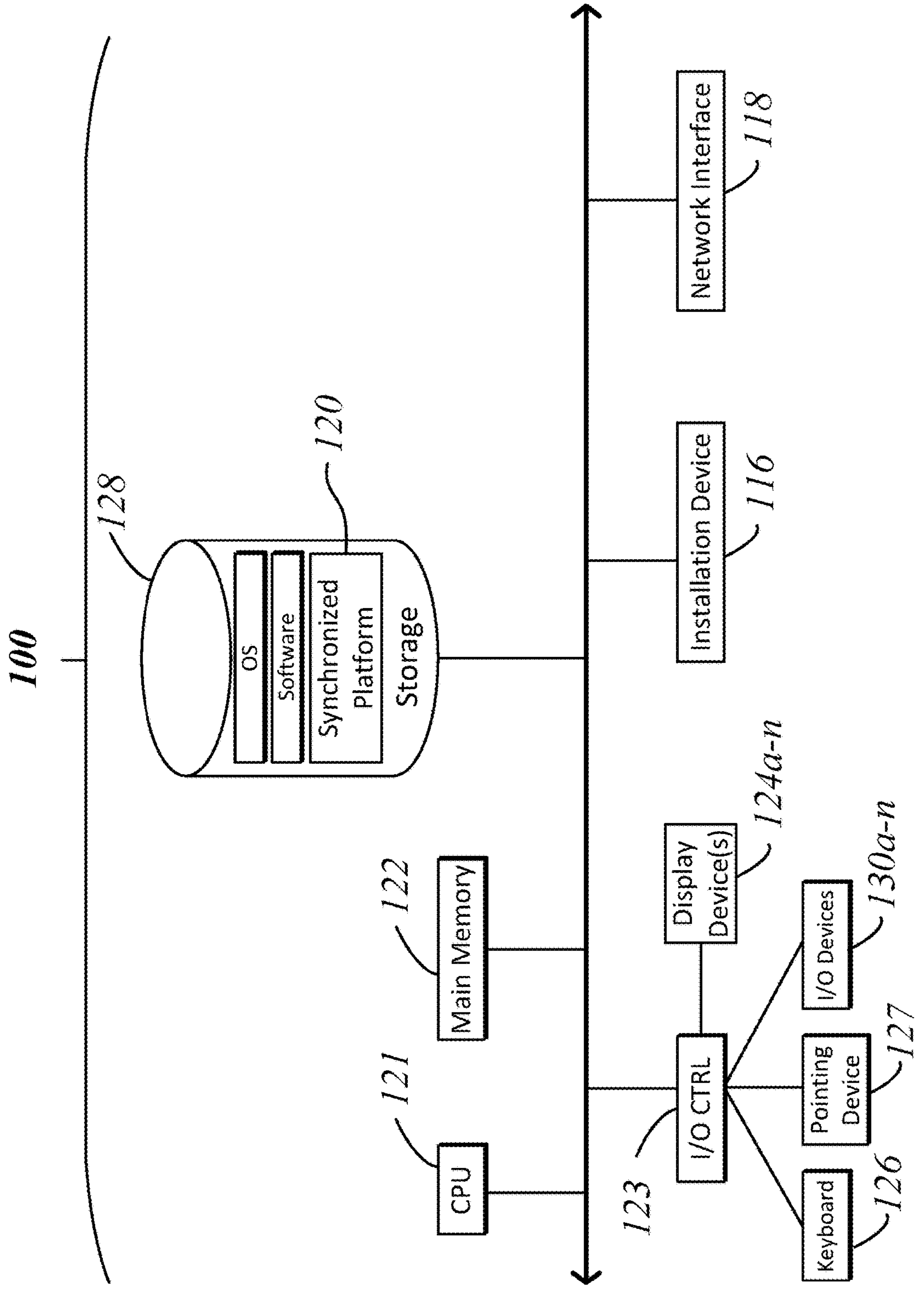
FIGS. 1C and 1D are block diagrams depicting embodiments of computing devices useful in connection with the methods and systems described herein.
Figure 1D:
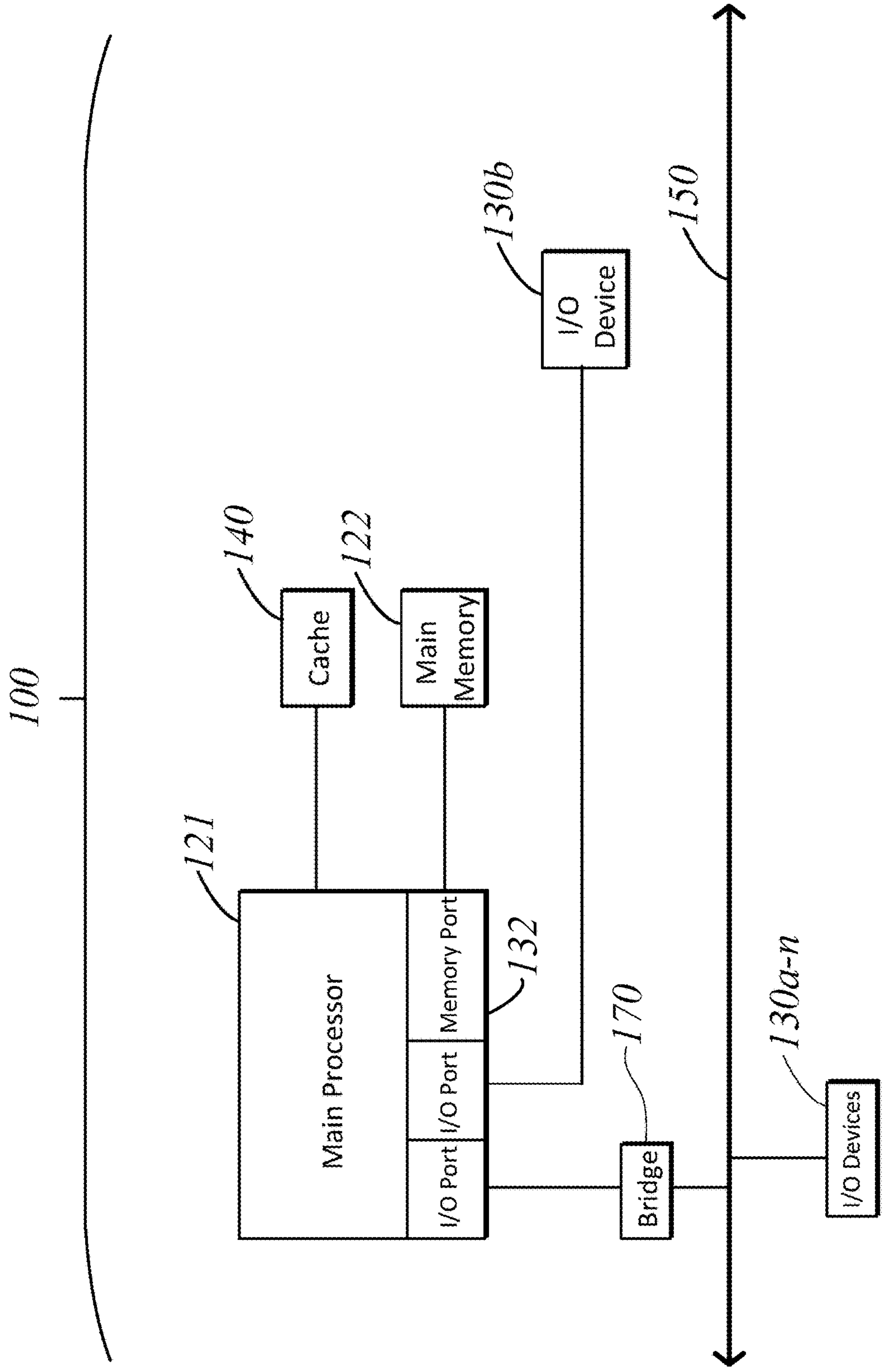

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for managing network sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124*a*-124*n*, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102*a*-102*n* may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, NINTENDO SWITCH, NINTENDO SWITCH 2 device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Modeling Data Trends

The systems and methods of this technical solution modeling dynamic data patterns, which can be used to simulate a changing environment within a network application. Due to the variety of factors that can affect stock price, it can be difficult to simulate stock market patterns using conventional random number generators, such as a linear random walk model. In an example, iterative updates to stock prices may be generated by randomly selecting a number that represents a percent increases or decreases (e.g., randomly selecting a number from −100 to 100). However, this can cause sudden decreases and increases that appear unrealistic. For example, real stock prices may follow broader trends influenced by persistent economic factors, such as international relations, trade policies, or shifts in global supply chains. As a result, real stock prices may rarely surge or crash, as such dramatic shifts are typically triggered by sudden changes in global conditions that are infrequent. Instead, stock prices often exhibit trends that, while subject to short-term fluctuations, generally align with broader patterns of growth or decline over a period of time.

To more accurately model changing stock prices, the described systems and methods can include skewed tables from which changes to stock prices can be randomly selected. As an example, there may be two skewed tables, including a first table that includes more modification values that increase a simulated stock price and a second table that includes more modification values that decrease a simulated stock price. Additionally, the average size of the increase modification values in the first skewed table may be smaller than the decrease modification values in that table. Similarly, the average size of the decrease modification values in the second skewed table may be smaller than the increase modification values in that table. The systems and methods may select either the first or second skewed table based on whether a previous modification value increased or decreased the simulated stock price. For example, the systems and methods may select the first skewed table based on determining that the previous modification value increased the simulated stock price. As a result, the systems and methods may be most likely select a relatively small modification value that continues a trend of increasing or decreasing the simulated stock price at each iterative updated to the simulated stock price. This may allow the simulated stock price to better mimic data trends of real stock prices.

Furthermore, it may be difficult to simulate engaging data patterns that can change in volatility. For example, when randomly selecting modification values using a random linear walk model, the model may select relatively small multipliers. The described methods may set a threshold for a stock split and/or reverse split. Since modification values may be applied as a percentage point change to the original simulated stock price, splitting the simulated stock may increase volatility (e.g., as the change is now applied to twice the number of shares), while applying a reverse split may decrease volatility (e.g., as the change is now applied to half the number of shares). Applying stock splits and reverse splits can allow the system to dynamically change volatility during a network communication session, which may create more engaging and/or realistic data patterns. For example, this variability in volatility may mimic real-world conditions.

Figure 2:
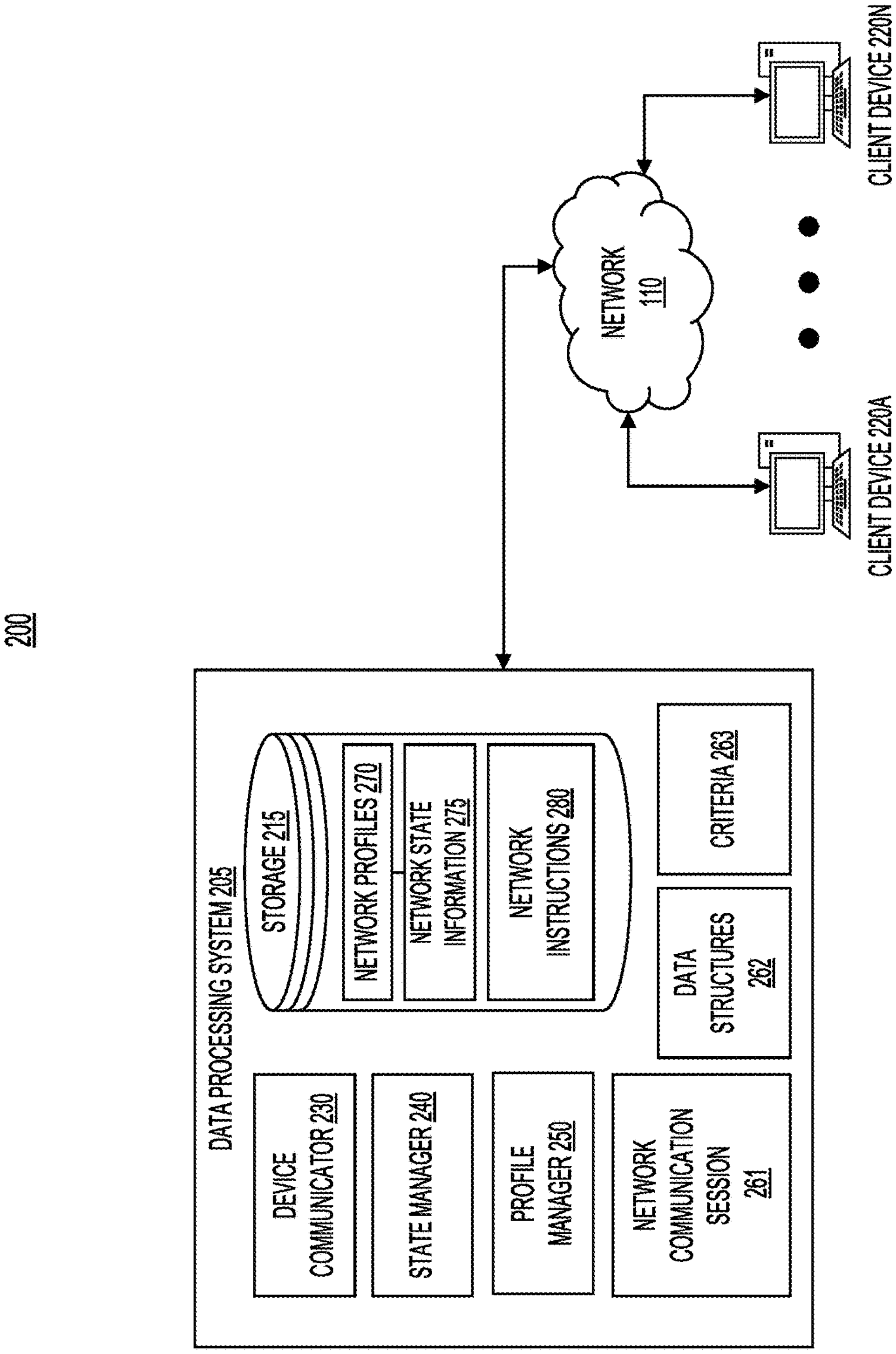
FIG. 2 is a block diagram of an example system for dynamic modification of application conditions within iterative network-accessible applications, in accordance with one or more implementations.

Referring now to FIG. 2, illustrated is a block diagram of an example system 200 for dynamic modification of application conditions within iterative network-accessible applications, in accordance with one or more implementations. In FIG. 2, the system 200 can include at least one data processing system 205, at least one network 210, and one or more client devices 220A-220N (sometimes generally referred to individually or collectively as "client device(s) 220"). In FIG. 2, the data processing system 205 can include at least one device communicator 230, at least one state manager 240, at least one profile manager 250, and at least one storage 215. The storage 215 can include one or more network profiles 270 (sometimes referred to herein as "player profiles 270"), network state information 275 (sometimes referred to herein as "game state information 275"), and one or more sets of network instructions 280. The data processing system 205 is shown as including one or more network communication sessions 261, one or more data structures 262, and one or more criteria 263.

Each of the components (e.g., the data processing system 205, the network 210, the client devices 220, components thereof, etc.) of the system 200 can be implemented using the hardware components or a combination of software with the hardware components of a computing system, such as the server 106, the client computing system 102, or the computing system 100 described in connection with FIGS.

1A-1D, or any other computing system described herein. For example, the system 200 may be executed by one or more processors coupled to non-transitory memory. In this example, the storage 215 may represent the non-transitory memory.

The data processing system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-1D, or any other computing system described herein.

The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks.

The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the data processing system 205, the one or more client devices 220, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the server 106, the client computing system 102, the computing system 100, etc.) may also communicate wirelessly with the computing devices of the network 210 via a proxy device (e.g., a router, network switch, or gateway).

Each of the client devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the client computing system 102 or the computing system 100 described in connection with FIGS. 1A-1D, or any other computing system described herein.

Each client device 220 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display multiple in-game events as described herein. The display can include a touch screen displaying an application, such as the gaming applications described herein. The display can include a border region (e.g., side border, top border, bottom border).

In some implementations, the display can display graphical content. For example, the data processing system 205 can transmit instructions for formatting graphical content representing a simulated stock price. The client device 220 can then render graphical elements within the display according to the instructions for formatting graphical content. As an example, the graphical elements may include a graph that visually represents change over time of a simulated stock price. The display may also receive user interactions. For example, the display may be a touch screen display that can directly receive interactions or a computer display that can receive interactions through an object, such as a mouse. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. The actionable object may be a graphical element displayed on the client device 220. As an example, the client device 220 can indicate a modification to a simulated stock holding, such as an instruction to buy or sell at least part of the stock holding.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be a gaming application that communicates with the data processing system 205 to play games, as described herein. The client application can include an application executing on each client device 220 or provided to the client device 220 by the data processing system 205.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the network profiles 270, the network state information 275, or the network instructions 280, stored and maintained at the storage 215, and generate one or more actionable objects, such as the actionable objects (e.g., interactive objects) described herein below in connection with FIGS. 3A-5, to a user (sometimes referred to herein as a "player") through a client device 220. Such actionable objects can include player-selectable hyperlinks, buttons, graphics, videos, images, or other application features that generate a signal that is processed by the application executing on the respective client device 220.

The network communication sessions 261 can be executions of the application. For example, the application can be associated with network communication sessions 261 that represent individual executions of the application that each iteratively execute a set of operations until a termination condition is satisfied. The network communication sessions 261 may have different application conditions. For example, the network communication sessions 261 may have different probabilities that influence the outcomes of network interactions. In some implementations, the one or more network communication sessions 261 can be or include one or more application sessions (e.g., of the virtual application), an execution session, a desktop session, a hosted desktop session, a terminal services session, a browser session, a remote desktop session, a URL session and/or a remote application session, among others. Each network communication session 261 can include encrypted and/or secure sessions, which can include an encrypted file, encrypted data or traffic. Each client device 220 can use the network communication session 261 established with the data processing system 205 to carry out any of the functionalities described herein. For example, the application executing on each client device 220 can perform any of the client-side operations described herein, including displaying any of the user interfaces shown in FIGS. 3A-3B, or any other types of user interfaces described herein.

Each of the client devices 220 can be computing devices configured to communicate via the network 210 to access information resources, such as web pages via a web browser, or application resources via a native application executing on a client device 220. When accessing information resources (e.g., instructions/assets for displaying/presenting, modifying, or otherwise navigating graphical user interface(s), etc.) the client device 220 can execute instructions (e.g., embedded in the native applications, in the information resources, etc.) that cause the client devices 220 to display various application interfaces, such as the user interfaces described herein below in conjunction with FIGS. 3A-3B. The application interfaces can be, for example, application interfaces that present different types of network information, or other types of interactive graphical user interfaces. In general, the graphical user interfaces may include various different types of interactive or non-interactive assets (e.g., images, video, animations, graphics, audio, etc.) that is presented to a user via the input/output interfaces of a client device 220. In some examples, graphical elements within respective interfaces displayed to each of client devices 220 within one of the network communication sessions 261 may be synchronized. For example, client devices 220 within the same network communication session 261 may display at least some graphical elements that display consistent appearance and location within the respective interfaces.

In response to interactions with user interface elements, the client devices 220 can transmit information, such as network profile information (e.g., changing profile parameters, changing login information, any information stored in a network profile 270, etc.), interaction information, selections of wager amounts, selections of gaming participation events, or other signals to the data processing system 205. For example, application conditions of a network communication session 261 may be modified in response to receiving interaction information from client devices 220. As an example, the client device 220 may transmit input that removes or adds simulated stocks from a virtual portfolio. The network communication session 261 can iteratively apply modification values to a simulated stock price. In some examples, a sequence of modification values representing a full day of trading may be applied in response to input from the client device 220. As an example, the client device 220 can submit a request to advance the state of the network communication session 261. In response to receiving the request from the client device 220, the data processing system 205 can advance the state of the network communication session 261 by iteratively selecting modification values and applying them to the simulated stock price until a termination condition is met.

The data processing system 205 is shown as including the storage 215. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. For example, the storage 215 can include sets of modification values. The sets of modification values can include different skews (e.g., ratios of modification values that result in an increase to modification values that result in a decrease) of modification values. Each set of modification values may be stored with an identifier that indicates how the set of modification values is skewed. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220 (e.g., via the user interface similar to that depicted in FIGS. 3A-3B, etc.), or any other computing devices described herein.

The storage 215 can store one or more network communication sessions 261. Network communication sessions 261 may be started in response to a request from a client device 220 to execute an application. For example, in response to receiving the request from a client device 220, a network communication session 261 may be started. Alternatively, the client device 220 may be assigned to an existing network communication session 261. In an example, network communication sessions 261 may be based on other conditions, such as termination of other network communication sessions 261, at regular intervals of time, and/or based on engagement with the application (e.g., a number of user requests to execute the application). Network communication session 261 can include a record of one or more interactions between the client devices 220 and the data processing system 205. For example, a network communication session 261 can include record of investments (e.g., investments in the simulated stocks) transmitted by client devices 220. In an example, the display of each of the client devices 220 can indicate investments and/or percentage point changes of other client devices 220 associated with a same network communication session 261. Network communication session 261 may conclude when a termination condition is satisfied. The termination condition can include one or more thresholds indicating a predetermined number and/or value of an attribute of the network communication session 261, at which point the network communication session 261 is terminated. At the conclusion of a network communication session 261, network profiles 270 associated with the client devices 220 that participated in the network communication session 261 may be updated. For example, the network profiles 270 may be updated based on user input from the client devices 220 received during the network communication session 261 and/or attributes of the application at the termination of the network communication session 261. As an example, the network profiles 270 may be updated to reflect net loss or gain based on the investments submitted by the client devices 220.

The storage 215 can store one or more network profiles 270 associated with a user (sometimes referred to herein as a "player") of a client device 220. In some implementations, the network profiles 270 may sometimes be referred to as "player profiles 270". A network profile 270 of a player can be a user profile that includes information about the player and information about one or more of the client devices 220 used to access the data processing system 205 using the network profile 270. For example, identifiers of the network profile 270 can be used to access the functionality of the data processing system 205 (e.g., by logging into the data processing system 205 via one or more web-based interfaces). The identifiers can include a username, a password, an e-mail address, a phone number, a personal identification number (PIN), a secret code-word, device identifiers for use in a two-factor authentication technique, among others. The network profile 270 can store information about wagers (e.g., investments), games, and gaming events that are performed by the player via the data processing system 205. The network profile 270 can store a credit balance, wager information or side wager information. The network profile 270 can store information about a client device 220 used to access the data processing system 205 such as an IP address, a MAC address, a GUID, a network profile name (e.g., the name of a user of the client device 220, etc.), device name, among others. For example, the network profile 270 can store location information determined based on interactions between each client device 220 and the data processing system 205. In some implementations, the network profile 270 can be created by the data processing system 205 in response to the network profile creation request transmitted by a client device 220. The network profile creation request can include any of the network profile information described herein.

The storage 215 can store or maintain network state information 275 associated with each of the one or more network profiles 270, for example, in one or more data structures. The network state information 275 can include information for interactive applications (e.g., desktop/network applications, remote desktop applications, interactive games, etc.) previously or currently accessed by a client device 220 using a corresponding network profile 270. In some implementations, a client device 220 accessing the data processing system 205 may not be associated with a network profile 270. In such implementations, the data processing system 205 can automatically create a network profile 270 using an identifier of the client device 220 provided by the client device 220. The network state information 275 can include any information relating to one or more network communication sessions 261 between a client device 220 and a data processing system 205. In some implementations, the network state information 275 can include state information for one or more network applications provided by the data processing system 205 to a client device 220. For example, the network state information 275 can include information relating to stock splits, changes to investment portfolios, or other data provided by the client device 220 during a play of a game or according to any other network application provided by the data processing system 205. As described in further detail herein, the state manager 240 can maintain (e.g., store, update, etc.), in corresponding network state information 275, a respective network state of applications as they are being accessed for multiple users accessing the data processing system 205. The network state information 275 can include one or more data structures that include any information related to a network state, including any values or data stored for an application instance accessed via a network communication session 261. In an example of a game, the network state information 275 can include information such as a current price of a simulated stock, a starting price of a simulated stock, stock splits applied to the simulated stock, current holdings of the client devices 220 in the simulated stock, and/or modification values that have been applied to the simulated stock.

The storage 215 can store or maintain network instructions 280. The network instructions 280 may include various instructions for one or more network applications that may be accessed at/provided by the data processing system 205. The network instructions 280 may include instructions for modifying the network state information 275 for a given network communication session 261. The network instructions 280 may include instructions to receive, transmit, and/or generate one or more data structures 262. In some implementations, the network instructions 280 may include instructions that compare various values stored as part of the network state information 275 to one or more criteria 263. The criteria 263 may include thresholds, conditions, values, path information, or other comparison information used by one or more network applications provided by the data processing system 205. For example, the criteria 263 can include one or more security criterion. The security criteria 263 can include one or more conditions for assigning client devices 220 to network communication sessions 261 (e.g., location proximities, etc.).

In some implementations, the network instructions 280 can include display/presentation instructions (e.g., network application formatting instructions), which may specify various assets, network configuration information, or other information used to provide various network applications to the client devices 220. The network instructions 280 can include instructions for playing various games (e.g., poker games). The network instructions 280 can specify one or more game events that occur in response to a particular game state. The network instructions 280 can include instructions to play a game from start to finish, for example, by streaming gaming content to each of the client devices 220 that initiate play of a particular game, or by executing the network instructions 280 and displaying content via a local display device. The network instructions 280 can be stored in one or more data structures that are indexed by a game name (e.g., blackjack, poker, rummy, craps, sic bo, Klondike, any other game, etc.). The network instructions 280 can be processor executable instructions that cause the data processing system 205 to provide one or more games to a client device 220 via a communication session.

In some implementations, the network instructions 280 can include conditions that trigger events within a network communication session 261. For example, the network instructions 280 can include a threshold for applying stock splits. The threshold may indicate a threshold price and/or change in price that triggers splitting each stock into at least two stocks. As an example, the network instructions 280 may indicate that a stock should be split when the current price of the stock represents a 100% increase from the original price. Additionally, or alternatively, the network instructions 280 can include conditions for selecting a set of modification values. Sets of modification values may refer to sets of values representing a percentage point change from a reference value (e.g., a simulated stock price at the start of the network communication session 261). The sets modification values may include different ratios of modification values that increase the price of the simulated stock to modification values that decrease the price of the simulated stock.

At each iteration of the network communication session 261, the data processing system 205 can identify a set of modification values from which a modification value can be selected based on conditions included in the network instructions 280. As an example, the network instructions 280 can indicate that the data processing system 205 should select a set of modification values that match an attribute (e.g., increase or decrease) of the previously applied modification value. Additionally, or alternatively, the network instructions 280 can include instructions for when the network communication session 261 should start and/or stop. For example the network instructions 280 can include a termination condition for ending a network communication session 261. The termination condition can include a predetermined value or number of an attribute of the network communication session 261, such as a threshold number of modification values, a threshold price of a stock, a threshold change in the price of a stock, and/or the like.

In some implementations, the network instructions 280 can include artificial intelligence models (e.g., machine learning models, neural network, decision trees, ruled-based lookup table, etc.) that cause the data processing system 205 to play an opposing entity to a player of one of the games in the network instructions 280. For example, the artificial intelligence model can generate an investment portfolio including a set of simulated stock picks. In this example, the data processing system 205 can compare a performance of the investment portfolio generated by the artificial intelligence model with investment portfolios of the client devices 220. During the network communication session 261, the artificial intelligence model can continue to generate predictions of changes to the investment portfolio, and the final net loss or gain can be compared to net losses and gains of the client devices 220.

Referring now to the operations of the data processing system 205, the device communicator 230 can establish a network communication session 261 (sometimes referred to herein as a game session) with a client device 220 in response to a request from the client device 220. Establishing the network communication session 261 may include generating network state information 275 for the network profile 270 used to access the data processing system 205 to initiate a play of a selected game. The request to establish a game session may include a request to play a game, which may be received in one or more messages from an application executing on each client device 220. The message, or request, can indicate that a player intends to play a game provided by the data processing system 205. The message can include an indication of a network profile 270 for use in connection with the functionalities related to the game (e.g., making investments using earned credits, purchasing additional credits, etc.).

Figure 3A:
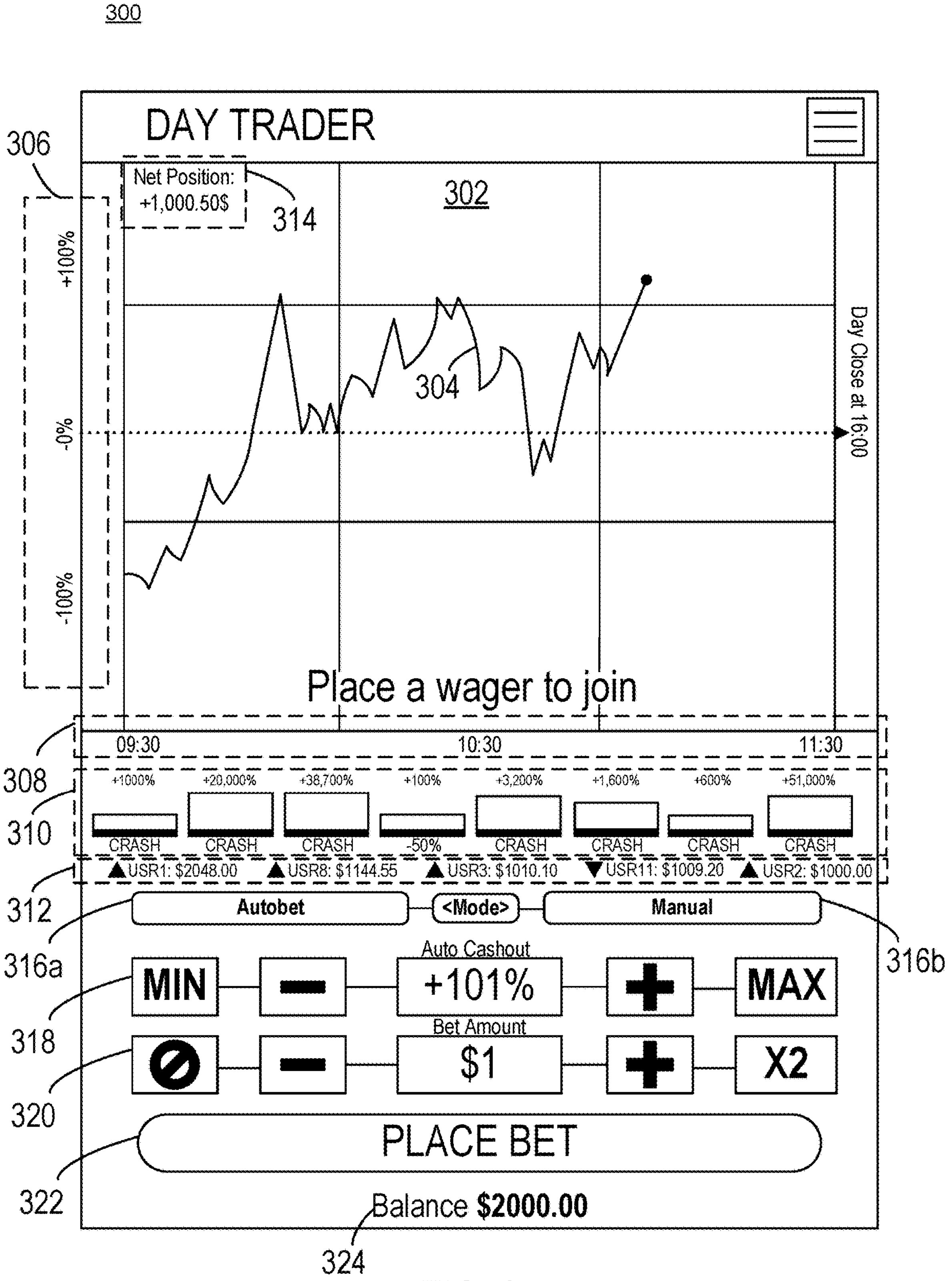
FIGS. 3A, and 3B depict example diagrams of graphical user interfaces that may be displayed in connection with modeling data trends, in accordance with one or more implementations.
Figure 3B:
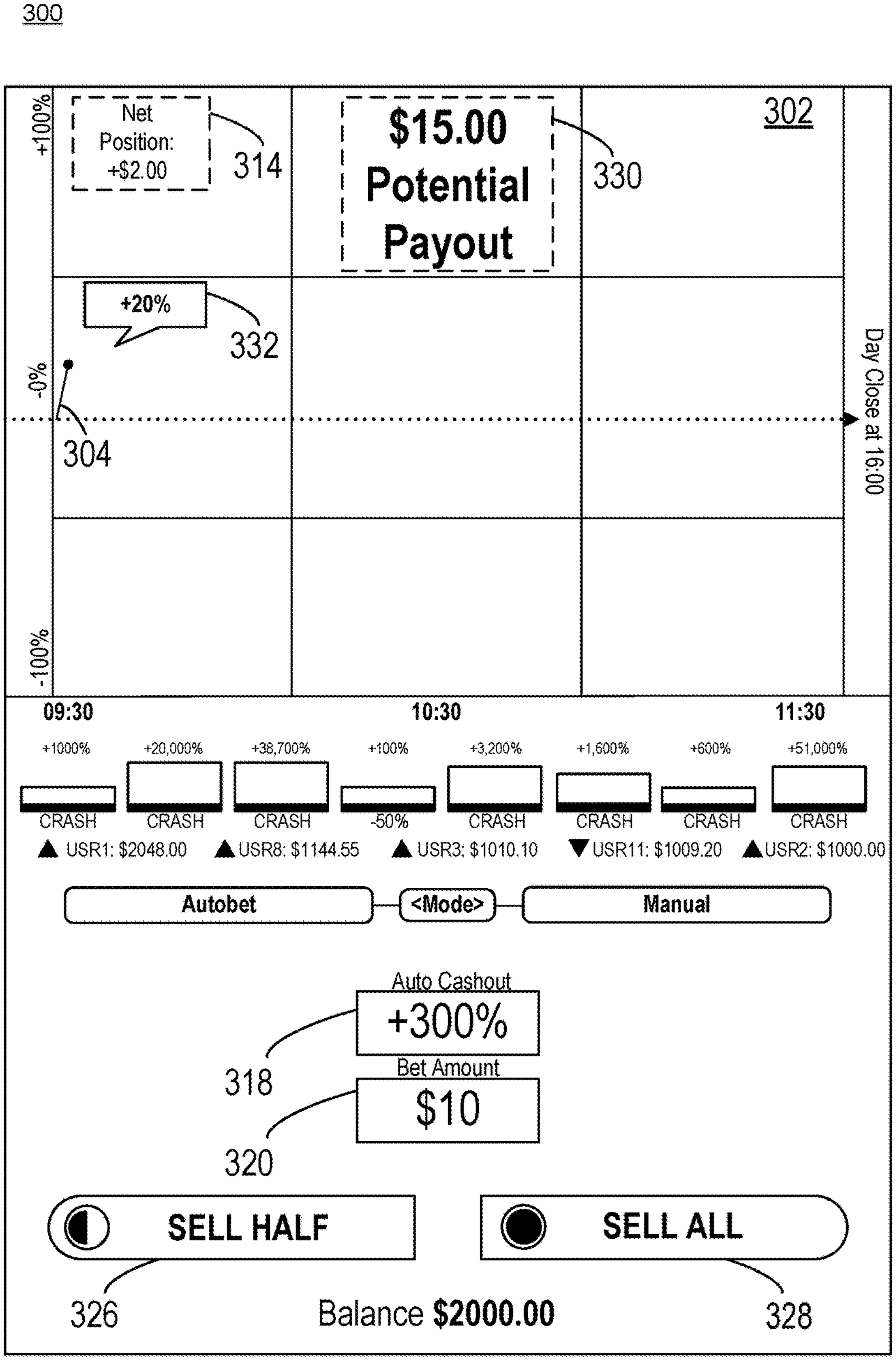

The message can include an identifier of a particular game to play. In some implementations, the device communicator 230 can provide the client device 220 with instructions to display one or more games to play in a list, allowing the player to select a game from the list. In response to an interaction indicating a selection, the client device 220 can transmit a signal identifying a game to the data processing system 205. Using the selection, the data processing system 205 can communicate a user interface for the game generated according to the game instructions 280 for the game and the network state information 275 for the game session. Such graphical user interfaces are shown in FIGS. 3A-3B.

A play of the game can involve a set of iterations that are executed until a termination condition is met. To initiate a play of the game, or during a play of the game, the device communicator 230 can receive one or more network communications/requests that include data structures 262 specifying investments (e.g., wagers) from the client device 220 (e.g., in response to movement of corresponding user interface elements presented at the client device 220, as described herein). The investment(s) may specify an investment amount (e.g., a wager amount) and/or simulated stock of the investment. In an example, each play may be executed at the request of the client device 220, and may include any number of iterations as described herein. For example, the data processing system 205 can apply a modification value to a simulated stock price (e.g., the state value") during one or more iterations, as described in further detail herein).

The client device 220 (or an application executing on the client device 220) can receive data relating to the requested game from the device communicator 230. The data relating to the requested game can include or may be generated based on network state information 275, which can be maintained by the state manager 240, as described herein. The device communicator 230 may determine updated information to provide to the client device 220 based on the network state information 275 for the game, which is initialized and updated by the state manager 240.

The state manager 240 updates and maintains the network state information 275, which may refer to the current state of one or more network applications described herein. In some implementations, the network state information 275 can maintain a state of a simulated investing game, including a starting price of simulated stocks, investments made by the client devices 220, changes to the prices of the simulated stocks at each iteration, and/or the like. The state manager 240 can maintain the outcome of each iteration (e.g., values of the simulated stocks) and whether the current play satisfies a termination condition. The state manager 240 can update the network state information 275 based on player interactions and network instructions 280. For example, the state manager 240 can update the network state information 275 when the client device 220 increases an investment in one of the simulated stocks, and/or the like. Similarly, the state manager 240 can update the network state information 275 based on events of the network application, such as a stock split.

The profile manager 250 can create, modify, or delete network profiles 270 stored within storage 215. The profile manager 250 can store and organize player information, including account details, preferences, and gaming history, among others. The profile manager 250 can generate profile information based on data received from the client devices 220. This allows the profile manager 250 to capture activity across different gaming applications and different devices, and store records of that activity in the network profile 270. The profile manager 250 can provide gaming statistics (e.g., historical game outcomes), and game progress to a requesting client device 220.

The profile manager 250 can update credit balances, game statistics, and other relevant information based on the outcomes of games played by a client device 220. The profile manager 250 can receive data about game results from the client devices 220 or the state manager 240 and use this information to make adjustments to the network profile 270. For example, the profile manager 250 can increase the credit balance of a network profile 270 corresponding to client device 220 by an award amount based on a performance of the investment portfolio indicated by that client device 220. Similarly, the profile manager 250 can record game statistics such as overall changes to simulated stocks, as well as the player's average investment portfolio size, performance history (e.g., in percentage points) of past portfolios, and/or the like. This allows players to track their progress and review their gaming history.

Although the foregoing has been described in a client-server arrangement, it should be understood that in some implementations, the data processing system 205 may locally execute one or more of the network applications. In such implementations, player profiles 270 may be maintained and/or accessed via one or more remote servers via the network 210. In such implementations, the data processing system 205 can include one or more display devices to present various graphical user interfaces described herein, as well as any suitable input device (e.g., buttons, switches, actuators, etc.) to receive input to interact with the applications provided via the data processing system 205. In some implementations, the data processing system 205 can include one or more physical receptacles, which may receive physical wager items (e.g., cards, chips, tokens, etc.) to enable users to indicate investments for various game applications provided via the data processing system 205.

Referring now to an example implementation of a stock simulation game, the data processing system 205 can receive a request to execute the application from a client device 220. In response to receiving the request, the data processing system 205 may either create a network communication session 261 or add the client device 220 to an existing network communication session 261. The existing network communication session 261 may be a network communication session 261 that is currently being executed (e.g., has already started) or a network communication session 261 that is waiting to start. The network communication session 261 may be associated with a plurality of client devices 220. In an example, the client devices 220 may each display an indication of how the stock portfolios of other client devices 220 in the network communication 261 are performing. For example, even in network communication sessions 261 that simulate performance of a single stock, buying and selling the simulated stocks at different points in time of the simulated trading day results in different net positions (e.g., net gain or loss of the simulated stock portfolio).

In some implementations, each network communication session 261 may be associated with a single client device 220. In this example, the changes in price of the simulated stocks may be uniquely generated for each client device 220. In some examples, a network communication session 261 may be started based on a condition. For example, a network communication session 261 may be started (e.g., updated to an execution state) in response to receiving a threshold number requests (e.g., requests to participate and/or bets representing simulated investments) from each client device 220 to take part in the network communication session 261 of a network application.

The network application may be a network application that mimics changes in stock price of a virtual stock over time. For example, the network application can generate simulated stock prices based on a applying a sequence of semi-randomly selected modification values. Each network communication session 261 can include at least one simulated stock. Within the network communication session 261, the data processing system 205 can iteratively modify the simulated stock by applying modification values. The modification values may each include an amount of change to the simulated stock price that is either positive or negative. Each modification value may represent a positive or negative adjustment to the simulated stock price. For example, the modification values can represent percentage point changes from a reference price (e.g., the simulated stock price at the start of the network communication session 261 that represents the "open of the market"). As an example, a 5% modification value may increase a simulated stock associated with a value of $100 by $5 regardless of the current price of the simulated stock. In this example, a modification value that represents a percent change to a simulated stock price can be represented by various formats, such as +5%, 1.05, +0.05, and/or the like.

Client devices 220 can transmit input that defines an initial stock portfolio. For example, each of the client devices 220 can specify how much of a simulated stock they want to initially invest in at the beginning of the network communications session 261. In an example where there are multiple simulated stocks in the network communications session 261, each of the client devices 220 can also specify which stock they would like to invest in. During the network communication session 261, client devices 220 can transmit input that modifies their respective stock portfolios, such as instructions to buy or sell a simulated stock. In one example, client devices 220 may also have the capability to transmit input for executing more advanced operations, such as initiating calls or managing options. A call may refer to an agreement that gives the submitter a right (e.g., option, not an obligation) to buy a specified quantity of an asset at a predetermined price within a specified time period. An option may refer to an agreement that gives the submitter a right (e.g., option, not an obligation) to sell an asset at a predetermined price within a specified time period.

During the network communication session 261, the data processing system 205 can iteratively select a modification value to change the value of the simulated stock price. For example, in response to a request from one or more of the client devices 220, the data processing system 205 can begin to select a sequence of modification values. The first modification value may be chosen randomly. Subsequent modification values may be chosen based on attributes of a previous modification value. For example, the storage 215 can include at least two sets of modification values. As an example, the storage 215 can include a first set of modification values with a greater number of values that increase the simulated stock price (e.g., compared to modification values that decrease the simulated stock price), and a second set of modification values with a greater number of values that decrease the simulated stock price. In this example, the average size of the modification values that represent a majority in a set of modification values may be relatively small. For example, the average size of modification values that increase the stock price may be smaller than the average size of modification values that decrease the stock price in the first set of modification values.

In some implementations, the average size of modification values that decrease the stock price may be smaller than the average size of modification values that increase the stock price in the second set of modification values. As a result, the data processing system 205 may be most likely to select a modification value that continues on a trend (e.g., of decreasing or increasing) by a relatively small amount. In an example, the data processing system 205 may randomly select a modification value from a set of modification values after selecting the set of modification values based on whether the previous modification value increased or decreased the simulated stock price. The data processing system 205 can then apply the modification value to modify the simulated stock price. The data processing system 205 may repeat this process of selecting a modification value a plurality of times until a termination condition is met. In an example, the modification values may be selected periodically and/or based on conditions of the network communication session 261. As an example, the data processing system 205 may select a modification value every ten seconds. Additionally, or alternatively, the data processing system 205 may select a modification value based on determining that the client devices 220 have submit a threshold amount of change (e.g., number of portfolio changes and/or amount of the portfolio changes) to their simulated stock portfolio.

Within the network communication session 261, the data processing system 205 can apply a stock split when a simulated stock satisfies a split condition. The split condition can be a threshold increase in price from an original value. As an example, the data processing system 205 can apply a split in response to determining that the simulated stock price has increased over 100%. In this example, the split condition can also include subsequent thresholds that result in additional splits (e.g., 500%, 1,000%, and/or the like). The simulated stock can be split into two or more parts. The stock split may increase volatility of price changes. For example, the modification values may represent a percentage point increase or decrease relative to a reference price of the stock. This reference price may be the price at the beginning of the network communication session 261.

As a result, when a simulated stock is split into two shares, the value associated with the percentage point increase may be applied to both shares, thereby doubling the impact of the modification value. In real-world markets, stock prices often follow broader trends until a significant, stock-specific event occurs (e.g., such as breaking news), causing a sudden and dramatic price movement. In the simulation, a stock split mechanism can help replicate this behavior by allowing prices to follow general trend patterns (e.g., through skewed sets of modification values) until an acute event triggers a sharp upward spike and/or crash. In some examples, the data processing system 205 can similarly apply a reverse split where two shares are merged into one when the simulated stock price satisfies a reverse split condition. This may decrease the volatility of the simulated stock price.

In some implementations, the network communication session 261 of the stock simulation game may end when it satisfies a termination condition. The termination condition can include a number of modification values that have been applied, a threshold change in the simulated stock price, a threshold amount of time since the network communication session 261 started, and/or the like. In an example, the termination condition can include several conditions, and the network communication session 261 may terminate when at least one condition has been met. As an example, the termination condition can include a threshold of 400 steps, a simulated stock price of $0, and/or a simulated stock price that is 512 times the simulated stock price at the start of the network communication session 261 (e.g., 51,100% increase). In an example, the network communication session 261 may simulate a single trading day. In this example, subsequent network communication sessions 261 may pick up where a previous network communication session left off. For example, a network communication session 261 may start a stock at the simulated stock price it was associated with at the end of a previous network communication session 261. In an example where a network communication session 261 is associated with a previous network communication session 261, the graphical user interface presented to client devices 220 can indicate performances (e.g., percent gain or loss) of the client devices 220 in the previous network communication session 261. Example graphical user interfaces showing an example implementation of a card-based game are shown in FIGS. 3A-3B. &&&

Referring now to FIG. 3A in the context of the components described in connection with FIGS. 1A-D and 2, a graphical user interface 300 is presented on a client device for joining a network communication session. For example, the graphical user interface 300 may represent a network communication session that has already started, where the client device 220 can place a wager to join. The client devices may be a client device from the client devices 220, such as client device 220*a*. In this example, the graphical user interface 300 may be associated with a network session to which a group of client devices 220 have been assigned.

The network session may be an execution of an application that simulates data conditions. For example, the network session can simulate stock price fluctuations. As discussed above, the device communicator 230 can facilitate communication between the client devices 220 and the data processing system 205, allowing players to interact with a graphical user interface 300 and transmit their actions to the data processing system 205. As players engage (e.g., via client devices 220) with the graphical user interface 300, their actions, such as changes to investment portfolios of the simulated stocks, may be captured and stored in their network profile 270.

The graphical user interface 300 displays an interface for the iterative network application. The graphical user interface displays a graph 302 that includes a trendline 304. The trendline 304 can represent a relationship between time (e.g., virtual time representing a day of trading that may not correspond to actual time passed) and fluctuation of the stock represented by change in percentage points. For example, modification values can be periodically applied to modify the simulated stock price by a certain amount (e.g., of percentage points). In this example, the data processing system can select sets of modification values that are skewed towards having more modification values that are increasing, if the previous modification value increased the simulated stock price, or decreasing, if the previous modification value decreased the simulated stock price. As a result, the trendline 304 may tend to follow a general pattern of increasing or decreasing. In an example, the trendline 304 may be plotted along timeline 308. The timeline 308 may represent the passing of time on the x-axis of the graph 302 as modification values are applied to the simulated stock price. In an example, the network communication session may simulate one full day of trading. As a result, the timeline 308 may indicate change of the simulated stock price from a start time associated with an open of the market (e.g., 9:30 am ET) to an end time associated with a close of the market (e.g., 4:00 μm ET). In an example, the time markers may be plotted according to when modification values are applied. For example, the trendline 304 may move forward by a set amount of time each time a modification value is applied to the simulated stock price.

The trendline 304 may be displayed on a percent change scale 306. For example, the y-axis of the graph 302 may display a range from −100% change to 100% change. In an example, the modification values may represent a percentage point change to a reference value (e.g., the simulated stock price at the beginning of the network communication session). In this example, a modification value that represents a 5% increase may directly map to an increase of the trendline 304 by 5%. As an example, a y-coordinate of the most recent point may increase from 80% to 85%. In some examples, the data processing system may apply stock splits when the simulated stock price plotted by the trendline 304 meets a threshold. As an example, when the simulated stock price increases over 100%, as indicated on the percent change scale 306, the data processing system may apply the stock split.

The stock split may divide each share into two, with each new share representing half the original stock price. A client device that previously held a single share may hold two shares of the stock that represent the same total value as the single share. Splitting the stock may increase the volatility. For example, the percentage point changes determined based on the simulated stock price determined at the beginning of the network communication session may now be applied to both shares of the stock, doubling the effect of the percentage-wise changes of each modification value. In some examples, the data processing system can similarly apply reverse splits that merge two stock shares into a single stock share when the simulated stock price falls below a threshold (e.g., below 50% of original value, below 25%, below 10%, etc.). In some examples, the data processing system may scale the percent change scale 306. For example, in response to determining that the simulated stock price meets a scaling condition, such as exceeding a 100% increase, the data processing system may adjust the percent change scale 306 to better accommodate the trendline 304. Adjusting the percent change scale 306 can include increasing the range (e.g., to −200% to 200%) and/or decreasing the range (e.g., to −50% to 50%).

In some implementations, the graphical user interface 300 may display crash indicators 310. Crash indicators 310 may indicate the highest point previous network communication sessions reached before a crash occurred. The crash indicators 310 may also indicate a percent change in a simulated stock price at the end of each of the network communication sessions, such as a crash where the simulated stock price went to $0 (e.g., indicated by "CRASH") or a percent change from the beginning of the network communication session (e.g., "−50%"). In some implementations, the graphical user interface 300 can also display user statistics 312. For example, the graphical user interface can indicate a net position of each user based on an increase or decrease of their current simulated stock holdings from their initial investments. In an example, the user statistics 312 may be generated based on the current network communication session. Alternatively, the user statistics 312 may be generated based a plurality of network communication sessions that each user has participated in. For example, the data processing system may generate a total net position based on a plurality of net positions of a plurality of network communication sessions. The users may be labelled according to strings (e.g. "USR1" for a first user), and an icon (e.g., triangle) may be displayed as part of the user statistics 312 to indicate whether the indicated number is an increase or decrease. The users displayed as part of the user statistics 312 may each be associated with a client device that is also assigned to the network communication session. In an example, the graphical user interface 300 may display a net position 314 of the user interacting with the graphical user interface 300 on the graphical user interface 300. In this example, that value can be displayed to other users as part of the user statistics 312.

In some implementations, the graphical user interface 300 may allow client devices to automate at least part of the simulated investment process. For example, the graphical user interface 300 can indicate an autobet element **316*a* and a manual bet element 316*b*. In response to determining that the client device has selected the autobet element 316*a*, the data processing system can select a bet amount and a cashout amount. These amounts can be randomly selected or selected based on one or more logical rules. In response to determining that the client device has selected the manual bet element 316*b*, the data processing system can present auto cashout element 318 and a bet element 320. The auto cashout element 318 may allow the client device to select a threshold at which their simulated stock holding will be automatically cashed out. For example, as displayed in the graphical user interface, the simulated stock holdings may be cashed out when the simulated stock price increases to at least 101% of the simulated stock price at the beginning of the network communication session. The bet element 320 may allow the client device to select an amount to invest in the simulated stock. For example, the amount indicated at bet element 320 may be invested at a current simulated stock price. As an example, if the current simulated stock price is $100, then a bet of $1 may purchase 0.01 of the simulated stock. The client device can select to set the auto cashout and/or bet amount by selecting place bet element 322. As the simulated stock price changes based on the modification values, the value of the net position 314 may change to reflect an increase or decrease of the value of the simulated stock that the client device has placed a bet on. In some implementations, the graphical user interface can also display a balance 324 associated with the client device. The balance 324 may be an amount associated with a network profile of the client device, and the client device may place an amount up to the balance 324 at the bet element 320**.

Referring to FIG. 3B in the context of the components described in connection with FIG. 2, a graphical user interface 300 is presented on the client device 220*a* in response. The graphical user interface 300 of FIG. 3B may represent a network communication session that is different than that of FIG. 3A. For example, the graphical user interface 300 of FIG. 3B may represent the first iteration of network communication session. The client device may submit an initial wager and/or cashout condition via the auto cashout element 318 and the bet element 320. As depicted in FIG. 3B, the client device has submitted a bet of $10 with a 300% cashout condition. The data processing system can then select a modification value and update the graphical user interface of the client device to the graphical user interface 300 of FIG. 3B.

In some implementations, the graphical user interface 300 may include percent change indicator 332 on the graph 302. For example, the data processing system can randomly select a modification value indicating a percentage point change of the simulated stock price. As depicted in the graphical user interface 300, the modification value selected indicates a 20% increase in the simulated stock price. The trendline 304 may rise accordingly. In some examples, the net position 314 may change based on the modification value and the bet indicated at the bet element 320. For example, with a $10 bet and a modification value indicating a 20% increase, the net position 314 may reflect a $2.00 gain in the current holdings of client device 22.

In some implementations, the data processing system can select a set of modification values from which to select a second modification value based on a first modification value. For example, based on the first modification value increasing the simulated stock price, the data processing system can select a set of modification values with a greater number of modification values that represent an increase than represent a decrease. In this set of modification values, the modification values that represent an increase may be associated with a relatively small average size compared to the modification values that represent a decrease. As a result, when the data processing system randomly selects a second modification value from the set of modification values, it may be most likely to select a modification value that represents an increase of a relatively small size.

In some implementations, the graphical user interface 300 may display a sell half option 326 and a sell all option 328. These options may be associated with the auto cashout element 318. For example, when the sell half option 326 is indicated, the data processing system may automatically sell half of the holding when the simulated stock price meets a 300% gain. At a growth of 300%, the initial investment may be valued at $30. As a result, the cashout may be $15 if the sell half option 326. Alternatively, the cashout may be $30 if the sell all option 328 is selected. The potential payout may be indicated as part of the payout element 330. Based on user selections of a cashout threshold and/or current bet amount, the data processing system can determine the payout that the user receives at that threshold. The data processing system can then display this information at the payout element 330. As depicted in the graphical user interface 300, the sell half option 326 is selected and the payout element 330 displays "$15" as the potential payout.

Figure 4:
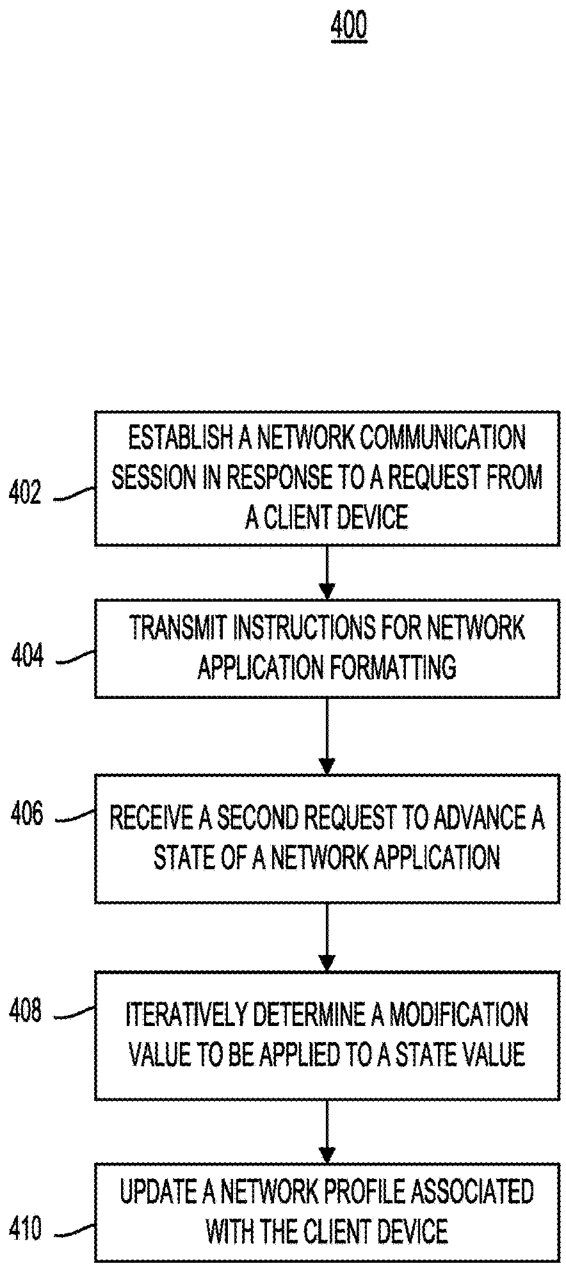
FIG. 4 illustrates an example flow diagram of a method for modeling dynamic volatility in distributed computing environments, in accordance with one or more implementations.

Referring now to FIG. 4, depicted is an example flow diagram of a method 400 for modeling dynamic volatility in distributed computing environments, in accordance with one or more implementations. The method 400 can be executed, performed, or otherwise carried out by a data processing system. A data processing system (e.g., the data processing system 205) can be remote to one to one or more client devices (e.g., client devices 220) and communicate with the one or more client devices via a computer network. In some implementations, the operations of method 400 can be performed by a standalone gaming device (e.g., without communicating with a gaming server to perform the method steps). In a brief overview of the method 400, the data processing system can establish a network communication session in response to a request from a client device (STEP 402), transmit instructions for network application formatting (STEP 404), receive a second request to advance a state of a network application (STEP 406), iteratively determine a modification value to be applied to a state value (STEP 408), and update a network profile associated with the client device (STEP 410).

In further detail of the method 400, the data processing system can establish a network communication session in response to a request from a client device (STEP 402). For example, the client device may transmit a first request to join a network communication session of a network application. The network application may be a software framework that executes a game and the network communication session may be a runtime instance of the network application where one or more client devices may participate by transmitting input. In response to receiving the first request, the data processing system can establish the network communication session of the network application. Alternatively, the data processing system may add the client device to an existing network communication session. The existing network communication session may be at least partway through applying a sequence of modification values to generated updated state values. In some examples, the network communication session may be associated with a plurality of client devices. For example, the data processing system can add additional client devices to the network communication session or add the client device to a network communication session to which other client devices have already been assigned.

The data processing system can transmit instructions for network application formatting (STEP 404). The instructions can specify how to format interfaces of the network application, such that client devices render graphical elements, textual content, or interactive objects, among others, according to any of the graphical user interfaces described herein. The instructions can define coordinate grids, font attributes, color values, and/or scaling parameters (among other possible parameters/attributes) for each interface element. The instructions can further include conditions that map interface states to user interactions, for example, by associating touch coordinates with interactive/actionable objects/elements. In response to receiving the instructions, the client device can render the interfaces of the network application according to the specified formatting.

The data processing system can receive a second request to advance a state of the network application from the client device (STEP 406). For example, the data processing system can receive a bet as the request to advance the state of the network application. The value of the bet may represent the state value. The bet may represent an investment in a simulated stock associated with the network application. In response to receiving the bet, the data processing system may begin to select and apply modification values to the state value. Second request can include additional information, such as thresholds for actions. For example, the second request can set a threshold at which an action may be performed. The threshold may represent a threshold amount of change (e.g., in percent) of the bet at which it should be cashed out (e.g., auto cashout, as indicated in the auto cashout element 318 of FIG. 3A). Additionally, or alternatively, the second request can include wager instructions. For example, the second request can indicate whether the data processing system should automatically configure one or more wager settings. In this example, the data processing system may automatically configure one or more wager settings (e.g., wager amount, cashout point, and/or the like) in response to receiving an indication (e.g., selection of the autobet element 316*a* of FIG. 3A). Alternatively, the client device can indicate that wager settings should not be automatically configured (e.g., select the manual bet element 316*b* of FIG. 3A). In an example, the client device may submit the second request by submitting a graphical icon (e.g., place bet element 322 of FIG. 3A).

The data processing system can iteratively determine a modification value to be applied to a state value (STEP 408). For example, in response to determining that the network communication session satisfies a start condition, the data processing system may select a first modification value. The start condition can include be receiving a threshold number of bets from the client devices, a threshold amount of time passing since the network communication session was established, a threshold number of client devices being assigned to the network communication session, and/or the like). In some examples, the data processing system can iteratively determine and apply a sequence of modification values. For example, the data processing system can select a modification value, apply the modification value to generate an updated state value, and then either continue to select another modification value or end the network communication session by updating network profiles based on whether a termination condition has been met.

In some implementations, the data processing system may iteratively apply each modification value. For example, the data processing system may generate a first updated state value by applying a first modification value to the state value transmitted by the user device. As an example, if the first state value is $10, and the first modification value is +20%, the updated state value may be $12. In this example, the data processing system can display +$2 as the net position of the client device. The data processing system can then generate a second updated state value by applying a second modification value to the first updated state value. As an example, if the second modification value is +10%, the second updated state value may be $13. In this example, the dollar amount of change to the state value may be determined based on the sequence of modification values and the state value that was initially submitted by the client device. The data processing system can continue to iteratively select and apply modification values until the termination condition is satisfied.

In some implementations, the data processing system may determine that the sequence of modification values satisfy a reduction condition. The reduction condition may be a threshold amount of growth, such as 100% growth. The data processing system can determine whether the sequence of data processing system satisfies the reduction condition by determining the sum of the sequence of modification values and determining whether it satisfies the threshold amount of growth. The data processing system can evaluate whether the reduction condition is satisfied each time a modification value is applied. In response to determining that the sequence of modification values satisfies the reduction condition, the data processing system can update the state value according to the reduction condition value. The data processing system may assign a multiplier to the state value that simulates a stock split. As an example, to simulate splitting each share into two shares of stock, the data processing system can assign a multiplier value of two to the state value. The multiplier value may be applied to updates to the state value generated based on the modification values. As an example, if the data processing system has applied a multiplier value of two to the state value, the initial bet was $10, and a current modification value is 5%, the state value may be updated to increase by $1 rather than $0.50. Since the bet submitted by the client device now represents twice the number of shares, and the percentage point change applied to each share, the modification value may now have double the effect on the state value. In an example, the reduction condition may be a negative amount of growth (e.g., "−100%). In this example, the data processing system may simulate a reverse stock split by applying a multiplier value that is less than one (e.g., 0.5). This may reduce the effect of each modification value on the state value.

In some implementations, the data processing system may apply the multiplier value to a second sequence of modification values. For example, modification values applied up until the point that the sequence of modification values satisfied the reduction condition may be referred to as a first sequence of modification values. The data processing system can then apply the multiplier value to subsequent modification values representing the second sequence of modification values. In this example, the data processing system can generate the updated state value by applying both the multiplier value and the second sequence of modification values to the state value. In an example, the reduction condition can include multiple thresholds (e.g., 100% growth, 200% growth, and/or the like). In this example, each threshold may be associated with a multiplier value (e.g., the same or different values), and the multiplier values may be applied cumulatively as the thresholds are met.

In some implementations, the data processing system may transmit each modification value to the client device. For example, the data processing system may transmit instructions to display the modification values on a graphical user interface presented to the client device as they are selected. As an example, the data processing system can generate graphical elements (e.g., percent change indicator 332 of FIG. 3B) indicating percentage point changes associated with the modification values that are presented on the graphical user interface.

In some implementations, the data processing system can determine that the termination condition has been satisfied based on the updated state value and/or sequence of modification values. For example, the termination condition can be associated with either a current state value or the sequence of modification values. In an example, the termination condition may be a determining a predetermined (e.g., threshold) number of modification values. The predetermined number of modification values may represent a day of trading. As an example, each modification value may represent a half hour of a trading day that spans from 9:30 am to 4:00 μm (e.g., as represented by timeline 308 of FIG. 3A). In this example, the data processing system can determine that the termination condition has been satisfied in response to determining that it has selected nine modification values. Alternatively, the termination condition can include a threshold amount of change (e.g., 60,000%) of the updated state value, a threshold increase and/or decrease in the value associated with the updated state value, a threshold amount, and/or the like. In some examples, the termination condition can include a plurality of conditions, and the data processing system can determine that the termination condition is met when at least one of the conditions is met. As an example, the conditions can include reaching a 100% decrease in value (e.g., the simulated stock has crashed), a predetermined number of steps (e.g., the trading day is done), and/or reaching a threshold amount of increase in value (e.g., the stock has gone "to the moon").

In some implementations, the data processing system may cause the client device to present a plot representing application of the sequence of modification values to the state value. For example, the data processing system can plot the sequence of modification values in relation to a timespan of a trading day (e.g., graph 302 of FIG. 3A). In this example, each time a modification value is selected and applied to the state value, the plot may be updated to represent the percentage point increase or decrease in the value of the simulated stock, and therefore the bet submitted by the client device as the state value. Each modification value may be associated with a predefined amount of time, and a plot point of the trendline may move forward by the predefined amount of time and up or down according to a selected modification value each time the a modification value is selected.

In some implementations, the data processing system may cause the data processing system to present historical data of other client devices. For example, the graphical user interface presented to the client device may a graphical element (e.g., user statistics 312 of FIG. 3A) associated with the historical data of the other client devices. The other client devices may be the other client devices participating in the network communication session. In an example, the historical data may include net position of the other client devices during one or more previous network communication sessions. For example, the historical data may present the net position at the end of a single network communication session or a cumulative performance (e.g., sum of net positions) of each client device across all of the network communication sessions they have participated in. Additionally, or alternatively, the data processing system may display a graphical element (e.g., crash indicators 310 of FIG. 3A) indicating historical performance of previous network communication sessions. The historical performance can indicate the total amount of change to the value of the simulated stock during each network communication session.

In some implementations, the data processing system may select each modification value by executing a selection function. The selection function may randomly select a value from a set of values. For example, the data processing system may identify a set of modification values and execute the selection function to select a modification value from the set of modification values at each iteration. In this example, the data processing system can identify the set of modification values from a plurality of modification values based on one or more attributes of the network communication session (e.g., whether the previous modification value increased or decreased the state value, and/or the like). The selection function can select elements based on predefined criteria. In an example, the selection function may execute the predefined criteria to emulate random selection. For example, the selection function may be a linear random walk model that executes a stochastic process to generate a sequence of random steps. These random steps may either be directly used as modification values or used to select a modification value from a set of modification values.

The data processing system can update a network profile associated with the client device (STEP 410). For example, based on determining that the termination condition has been satisfied, the data processing system can update the network profile based on the updated state value. As an example, the data processing system can update the network profile according to the net position (e.g., in dollars) of the updated state value at the termination of the network communication session. Additionally, or alternatively, the data processing system can update the network profile with the total change (e.g., in percent) represented by the sequence of modification values. The net position may represent the total increase or decrease to the state value at any given point. The data processing system may update the network profile by recording information associated with the network communication session (e.g., the net position and/or total change) and/or updating an amount of credits associated with the network profile to reflect the outcome of the network communication session. As an example, if the client device is associated with a net position of +$200 at the termination of the network communication session, the data processing system may add $200 (e.g., or an amount of credits determined based on this number) to the network profile associated with the client device.

Figure 5:
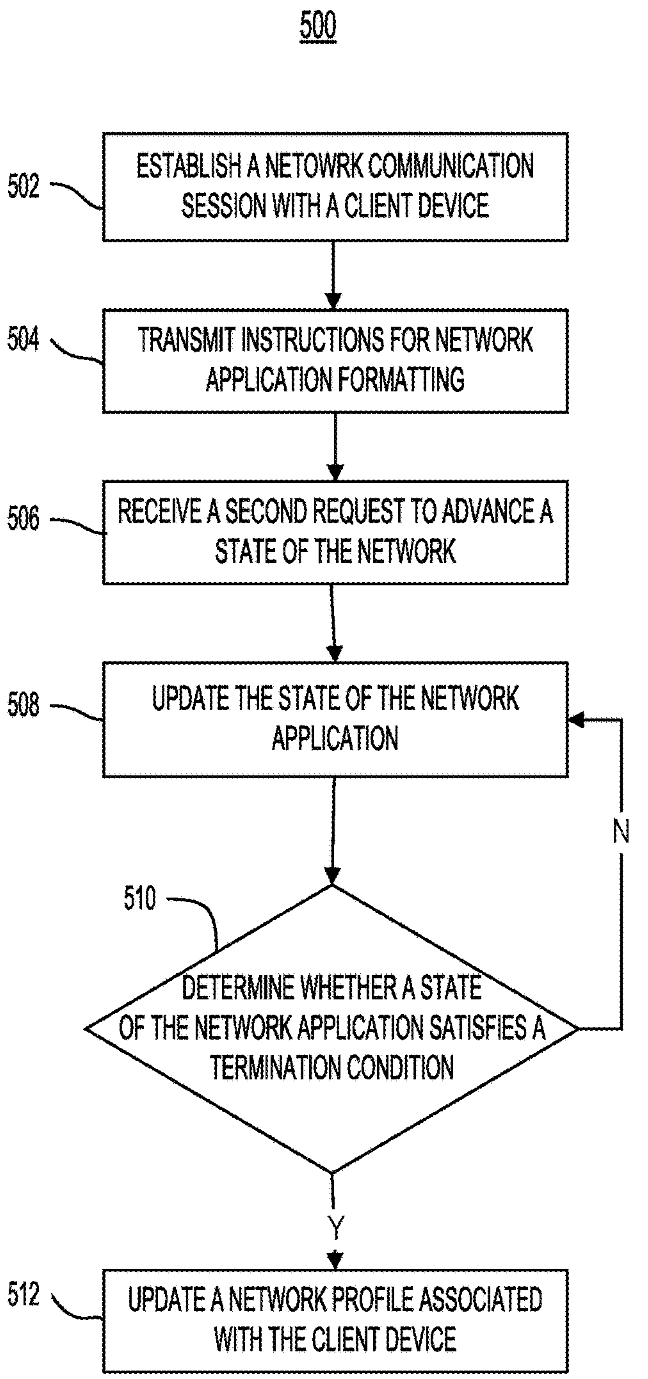
FIG. 5 illustrates an example flow diagram of a method for modeling data trends in distributed computing environments, in accordance with one or more implementations.

Referring now to FIG. 5, depicted is an example flow diagram of a method 500 for modeling data trends in distributed computing environments, in accordance with one or more implementations. The method 500 can be executed, performed, or otherwise carried out by a data processing system. A data processing system (e.g., the data processing system 205) can be remote to one or more client devices (e.g., client devices 220) and may communicate with the one or more client devices via a computer network. In some implementations, the operations of method 500 can be performed by a standalone gaming device (e.g., without communicating with a gaming server to perform the method steps). In a brief overview of the method 500, the data processing system can establish a network communication session with a client device (STEP 502), transmit instructions for network application formatting (STEP 504), receive a second request to advance a state of the network that includes a state value (STEP 506), update the state of the network application (STEP 508), and determine whether a state of the network application satisfies a termination condition (STEP 510). If the state of the network application does satisfy the termination condition, the data processing system may update a network profile associated with the client device (STEP 512). If the state of the network application does not satisfy the termination condition, the data processing system may return to STEP 508 to update the state of the network application based on another modification value.

In further detail of the method 500, the data processing system may establish a network communication session with a client device (STEP 502). For example, the data processing system may establish the network communication session in response to a first request from the client device. The first request may be a request to execute a network application. In response, the data processing system can either establish a new network communication session representing a new runtime instance of the network application or add the client device to an existing network communication session.

The data processing system may transmit instructions for network application formatting (STEP 504). For example, the data processing system can transmit formatting instructions that define how to structure headers, payloads, and metadata according to a predefined protocol. STEP 504 may be the same or similar to STEP 404 of FIG. 4.

The data processing system may receive a second request to advance a state of the network (STEP 506). The second request may include a state value indicated by the client device. For example, the data processing system may receive a bet as the second request, and the state value may be a value of that bet. The state value may be associated with a network profile of the client device. For example, the client device may place a bet up to an amount associated with the network profile. At the end of the network communication session, this profile may then be updated according to the bet placed by the client device and a sequence of state modification values applied to the state value (e.g., the bet) during the network communication session. In some examples, the data processing system may proceed to iteratively modify the state value in response to receiving the second request. In an example where a plurality of client devices are assigned to the network communication system, the data processing system may iteratively apply state modification values in response to receiving a threshold number of state values from the plurality of client devices.

The data processing system may iteratively update the state of the network application (STEP 508). For example, the data processing system may iteratively select a state modification value and update the state of the network application by applying the state modification value. In some examples, the data processing system may randomly select a first state modification value. For example, the data processing system may randomly select the first state modification value from all available state modification values or a predefined subset of those state modification values. After applying the first state modification value to the state value submitted by the client device as part of the second request to update the state of the network application, the data processing system may select subsequent state modification values based on the previous modification value. For example, the data processing system may access a plurality of sets of modification values to select a set based on the previous modification value. As an example, in response to determining that a respective state modification value of a previous iteration satisfies a first criterion, the data processing system may select a first set of state modification values. The first criterion may relate to any attribute of the first state modification value, such as a threshold level or a specific magnitude. A state modification value over the threshold may be a first type that increases the state of the network application, and a state modification value under the threshold may be a second type that decreases the state of the network application. The first criterion may be associated with a respective state modification value of a previous iteration being associated with the first type (e.g., an increase). Similarly, a second criterion may be associated with the respective state modification value of the previous iteration being associated with the second type. The data processing system can determine the respective state modification value for the iteration from the first set of state modification values based on the respective state modification value of a previous iteration satisfying the first criterion. As an example, the data processing system can randomly select the respective state modification value for the current iteration from the first set of state modification values. The data processing system can then update the state of the network application according to the selected state modification value for the current iteration and proceed to the next iteration.

In some implementations, the at least one iteration may be a first iteration of a plurality of iterations. For example, the data processing system can be configured to select the first state modification value from the first set of state modification values. The data processing system can then determine whether to select the next state modification value from the first or second set of state modification values based on the first state modification value. In an example, the data processing system can select a second state modification value of the second iteration from a second set of state modification values based on determining that the first state modification value satisfies a second criterion. The first criterion may be associated with the respective state modification value of a previous iteration being above a threshold and the second criterion may be associated with the respective state modification value of a previous iteration being below a threshold. The data processing system can continue to iteratively select either the first or second set of state modification values based on whether the respective state modification value of the previous iteration satisfies the first criterion or the second criterion, randomly select the state modification value of the current iteration from that set, and update the state of the network application according to the selected state modification value until the termination condition is met. In an example, the state modification values iteratively selected by the data processing system may represent a sequence of modification values.

Updating the state of the network application may include applying the state modification value to the state value and adjusting the state of the network application accordingly. The data processing system can apply the state modification value by multiplying the state modification value with the state value. As an example, the state value may be $10. The data processing system can select a first state modification value of 0.1. Based on multiplying 0.1 and $10, the data processing system can determine that the state of the network application should be increased by $1 to a current value of $11. Subsequently, the data processing system can select the first set of state modification values (e.g., of which the majority represents an increase to the state of the network application) based on the first state modification value resulting in an increase to the state of the network application. The data processing system can randomly select −0.05 as the state modification value for the current iteration from the set of modification values. Based on multiplying −0.05 and $10, the data processing system can determine that the state of the network application should be decreased by $0.50 to a current value of $10.50. The state of the network application may refer to attributes of the network communication session at the current iteration, such as the current value, determined by the state value submitted with the second request and the modification values selected throughout the iterations up to that point and/or a number of modification values that have been applied thus far. The data processing system can then continue to iteratively update the state of the network application until a termination condition is met.

In some implementations, the data processing system may select the set of state modification values based on a value of previously applied state modification value. For example, the data processing system may access at least two sets of modification values. The majority of the state modification values in the first set may increase the state of the network application, and the majority of the state modification values in the second set may decrease the state of the network application. The data processing system can select one of the two sets based on the value of the respective state modification value of the previous iteration. For example, based on determining that the value of the respective state modification value of the previous iteration is above a threshold, the data processing system may select the first set of state modification values that includes a greater number of state modification values that increase the state of the network application. In this example, the threshold may represent the first criterion. Similarly, based on determining that the value of the respective state modification value of the previous iteration is below a threshold, the data processing system may select the second set of state modification values that includes a greater number of state modification values that decrease the state of the network application. The threshold can indicate a point at which the state modification value causes an increase or decrease in the state of the network application. As an example, if the state modification values are multipliers applied to the state value, the threshold may be 0. Negative state modification values (e.g., −0.05) may decrease the state of the network application while positive state modification values (e.g., 0.05) may increase the state of the network application. The data processing system can therefore select a set of state modification values that continue to increase or decrease the state of the network application based on the value of the state modification value of the previous iteration.

In some implementations, the plurality of sets of state modification values may be associated with different distributions. For example, the first set of state modification value may be associated with a first distribution and the second set of state modification values may be associated with a second distribution. The term distribution may refer to a ratio of state modification values that increase the state of the network application to state modification values that decrease the state of the network application. The first and second set of state modification values may be associated with inverse ratios, where the first set of state modification values is associated with a first number of values of a first type (e.g., increasing the state of the network application) and the second set of state modification is associated with the first number of values of a second type (e.g., decreasing the state of the network application). The first number of values may represent the majority of the set. As an example, if each set includes 150 state modification values, the first value may be 100. In this example, the first set of state modification values may include 100 values of the first type (e.g., increasing) and 50 values of the second type (e.g., decreasing). Similarly, the second set of state modification values may include 100 values of the second type (e.g., decreasing) and 50 values of the first type (e.g., increasing).

In some implementations, an average size of the state modification values representing the majority of each set may be smaller than the average size of state modification values representing the minority. For example, the first set of state modification values can include the first number of values of the first type and a second number of values of the second type. The first number of values may be greater than the second number of values. In the first set of state modification values, a first average of the values of the first type (e.g., average absolute value) may be smaller than a second average of the values of the second type. Similarly, for the second set of state modification values, an average of the values of the second type may be smaller than an average of the values of the first type. As a result, the majority of values in the first set may be increasing state modification values of a relatively smaller size (e.g., compared to decreasing state modification values in that set) and the majority of the values in the second set may be decreasing state modification values of a relatively smaller size (e.g., compared to increasing state modification values in that set).

In some implementations, the data processing system may update the state value according to a reduction condition value. For example, after updating the state of the network application, the data processing system can determine that the sequence of modification values (e.g., modification values selected up until the current iteration) satisfies the reduction condition. The reduction condition may refer to a threshold amount of increase. Based on determining that the sequence of modification values satisfy the reduction condition, the data processing system can simulate a stock split. To simulate stocks being split into two, and the modification being applied to each share of stock, the data processing system may apply a reduction condition value. The reduction condition value may assign a multiplier value to the state value. For example, the reduction condition value may increase the impact of each update to the state value by assigning a multiplier that is applied to updates to the state of the network application. As an example, in response to determining that the sequence of modification values represent an increase of over 100%, the data processing system may assign a multiplier of 2 to simulate a stock split. In this example, if the state value is $10 and a subsequent state modification value is 0.1, the data processing system may increase the state of the network application by $2 (e.g., instead of $1) based on the multiplier. This can increase the volatility of the network communication session. In an example, the reduction condition value may also include a threshold for simulating a reverse stock split. In this example, the data processing system may reduce the impact of each state modification value by applying a multiplier that reduces the impact (e.g., is less than one).

The data processing system may determine whether the state of the network application satisfies a termination condition (STEP 510). For example, each time the state of the network application is updated, the data processing system may evaluate whether the state of the network application satisfies the termination condition. The termination condition may include a plurality of conditions, and the state of the network application may satisfy the termination condition when at least one of the conditions is satisfied. For instance, the termination condition may include a threshold number of state modification values that are currently in the sequence of modification values, a threshold increase in the value of the state of the network application (e.g., percent or dollar), and/or a threshold value of the state if the network application. As an example, the termination condition can include a threshold of 400 modification values, a 60,000% increase in the value of the network application, and/or a crash in value where the value of the network application is $0 (e.g., or near $0).

If the state of the network application does not satisfy the termination condition, the data processing system may return to STEP 508 to select a subsequent set of state modification values and update the state of the network application. If the state of the network application does satisfy the termination condition, the data processing system may update the network profile associated with the client device (STEP 512). The data processing system may update the network profile by adjusting an amount of credits associated with the network profile. For example, based on the state of the network application at the termination of the network communication session, the data processing system can determine a net position of the client device. The net position can represent whether the simulated investments of the client device net gain, net loss, or remained neutral over the course of the session. The data processing system can add or remove credits based on the net position. For example, if the state of the network application represents a net gain, the data processing system may add credits to the network profile. In some examples, the data processing system may also store information about the net position of the client device in the network profile. This information can be presented to the client device and/or other client devices within a subsequent network communication session.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for assigning protected network sessions for network applications, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
- one or more processors coupled to non-transitory memory, the one or more processors configured to:
  - establish a network communication session with a client device in response to a first request;
  - transmit, to the client device, instructions for network application formatting during the network communication session;
  - receive, from the client device, a second request to advance a state of a network application of the network communication session, the second request including a state value for the network application;
  - iteratively determine, via the network application, a modification value of a sequence of modification values to be iteratively applied to the state value to generate an updated state value until a termination condition has been satisfied, wherein each modification value of the sequence of modification values is determined by randomly selecting the modification value from at least one set of modification values; and
  - update a network profile associated with the client device based on the updated state value and the termination condition.

2. The system of claim 1, wherein the one or more processors are further configured to:
- iteratively apply each modification value of the sequence of modification values to the state value to generate the updated state value.

3. The system of claim 1, wherein the one or more processors are further configured to:
- determine that the sequence of modification values satisfies a reduction condition;
- responsive to determining that the sequence of modification values satisfies the reduction condition:
  - update the state value according to a reduction condition value, and
  - assign a multiplier value to the state value.

4. The system of claim 3, wherein the one or more processors are further configured to:
- iteratively determine a second sequence of modification values for the state value; and
- generate the updated state value by applying the multiplier value and the second sequence of modification values to the state value.

5. The system of claim 1, wherein the one or more processors are further configured to:
- transmit each modification value of the sequence of modification values to the client device.

6. The system of claim 1, wherein the one or more processors are further configured to:
- determine that the sequence of modification values satisfies the termination condition based on the updated state value satisfying a termination threshold.

7. The system of claim 1, wherein the one or more processors are further configured to:
- determine that the termination condition has been satisfied upon determining a predetermined number of modification values.

8. The system of claim 1, wherein the one or more processors are further configured to:
- cause the client device to present a plot representing application of the sequence of modification values to the state value.

9. The system of claim 1, wherein the one or more processors are further configured to:
- cause the client device to present a set of historical data corresponding to respective state values of a plurality of second client devices of a second network communication session.

10. The system of claim 1, wherein the one or more processors are further configured to:
- determine each modification value of the sequence of modification values by executing a selection function with respect to at least one value table.

11. A method, comprising:
- establishing, by at least one processor, a network communication session with a client device in response to a first request;
- transmitting, by the at least one processor, to the client device, instructions for network application formatting during the network communication session;
- receiving, by the at least one processor, from the client device, a second request to advance a state of a network application of the network communication session, the second request including a state value for the network application;
- iteratively determining, by the at least one processor, via the network application, a modification value of a sequence of modification values to be iteratively applied to the state value to generate an updated state value until a termination condition has been satisfied, wherein each modification value of the sequence of modification values is determined by randomly selecting the modification value from at least one set of modification values; and
- updating, by the at least one processor, a network profile associated with the client device based on the updated state value and the termination condition.

12. The method of claim 11, further comprising:
- iteratively applying, by the at least one processor, each modification value of the sequence of modification values to the state value to generate the updated state value.

13. The method of claim 11, further comprising:
- determining, by the at least one processor, that the sequence of modification values satisfies a reduction condition; and
- responsive to determining that the sequence of modification values satisfies the reduction condition:
  - updating, by the at least one processor, the state value according to a reduction condition value, and
  - assigning, by the at least one processor, a multiplier value to the state value.

14. The method of claim 13, further comprising:
- iteratively determining, by the at least one processor, a second sequence of modification values for the state value; and
- generating, by the at least one processor, the updated state value by applying the multiplier value and the second sequence of modification values to the state value.

15. The method of claim 11, further comprising:
- transmitting, by the at least one processor, each modification value of the sequence of modification values to the client device.

16. The method of claim 11, further comprising: determining, by the at least one processor, that the sequence of modification values satisfies the termination condition based on the updated state value satisfying a termination threshold.

17. The method of claim 11, further comprising: determining, by the at least one processor, that the termination condition has been satisfied upon determining a predetermined number of modification values.

18. The method of claim 11, further comprising: causing, by the at least one processor, the client device to present a plot representing application of the sequence of modification values to the state value.

19. The method of claim 11, further comprising: causing, by the at least one processor, the client device to present a set of historical data corresponding to respective state values of a plurality of second client devices of a second network communication session.

20. The method of claim 11, further comprising: determining, by the at least one processor, each modification value of the sequence of modification values by executing a selection function with respect to at least one value table.

* * * * *